3,262,943
PROCESS FOR PREPARING BENZOTRIAZOLE COMPOUNDS AND CERTAIN PRODUCTS THEREOF

James C. Kauer, Wilmington, Del., assignor to E. I. du Pont de Nemours and Company, Wilmington, Del., a corporation of Delaware
No Drawing. Filed Nov. 7, 1963, Ser. No. 322,033
15 Claims. (Cl. 260—308)

This invention relates to a new ring closure reaction. More particularly, it is concerned with a process for preparing polynitrogen heterocyclic compounds having o-phenylene-attached nitrogens and to certain products obtained therefrom.

New polynitrogen heterocyclic compounds having dibenzotetraazapentalene structures have recently been described (cf. U.S. Reissue 25,238; coassigned copending application Serial No. 252,059, now U.S. Patent 3,166,-567). These products, unlike most cyclic compounds having a plurality of nitrogens, are chemically and thermally stable. They withstand degradation on exposure to strong nucleophilic substitution reagents, and their polynitro derivatives have found utility as explosives having unusually high thermal stability. These dibenzotetraazapentalenes have been prepared by pyrolysis of (o-azidophenyl)benzotriazoles, through loss of molecular nitrogen accompanied by ring closure with components of the triazole system. However, this process is not completely satisfactory for several reasons. A rather impure product is obtained generally and several steps are required, i.e., reduction of the nitro compound to amine, diazotization of the amine, and treatment of the diazonium derivative with sodium azide. Also, azido compounds are often explosive. In certain instances, the azido compound is not readily prepared from the amine due to the latter's undergoing internal amidation.

A new method of preparing polynitrogen heterocyclic compounds having o-phenylene-attached nitrogens, such as the dibenzotetraazapentalenes, has now been found. This new method is a process for the ring closure of o-nitrophenyl-substituted compounds which comprises reacting (1) a tertiary phosphite or phosphine with (2) a nitrophenyl compound wherein one of the carbons ortho to the nitro group is attached to one of two adjoined nitrogen atoms that are components of (a) a heterocyclic group or (b) an o-nitroaryl substituted azo group.

More specifically, the new method is a process for the ring closure of (o-nitrophenyl)-substituted compounds which comprises reacting.

(1) A compound of the formula $$[R(O)_n]_3P$$

wherein R is an aliphatically saturated hydrocarbon radical, i.e., a hydrocarbon radical free of aliphatic carbon-to-carbon unsaturation, and $n$ is an integer in the range of 0 to 1, i.e., 0 or 1, with (2) A compound of the formula

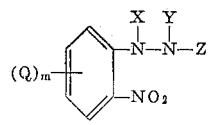

wherein (a) X and Y together are a single valence bond and Z is alkyl, aryl, aralkyl, or o-nitroaryl, or (b) X, Y and Z are components of a heterocyclic group T in which the heterocyclic ring includes the two depicted contiguous nitrogens and is composed of five members consisting solely of carbon and from 2 to 4 nitrogen atoms; when T is a 1,2,3-triazole its formula is

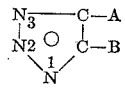

wherein A and B, separately, are hydrogen, lower alkyl, aryl, or alkoxycarbonyl (i.e., —COOAlkyl) of lower alkyl and, conjoined, are lower alkylene (including butadienylene, i.e., —CH=CH—CH=CH—), or benzobutadienylene, i.e.,

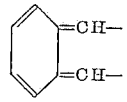

the inscribed circle depicts delocalized charge distribution, and the valence bond attaching it to the o-nitrophenyl group is at the 1, 2 or 3 position; and Q can be a lower alkyl, lower alkylene (including butadienylene, i.e., —CH=CH—CH=CH—), nitro, sulfo, or halo substituent, and $m$ is an integer in the range of 0 to 2, i.e., 0, 1 or 2.

In the above formulas, R is preferably a saturated aliphatic or aromatic hydrocarbon group containing from 1 to 18 carbon atoms; aryl Z, attached to an azo group, is preferably o-nitrophenyl; alkyl Z is preferably lower alkyl, i.e., of up to about 8 carbon atoms; aralkyl Z is preferably of 12 or fewer carbon atoms; and the heterocyclic group of which X, Y and Z are components is preferably a benzotriazole.

The ring closing reaction that is the principal basis of the new process can be illustrated further by the following reaction scheme

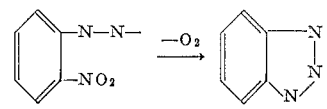

in which the formation of a triazole ring system is depicted, other components of the o-nitrophenyl reactant being omitted for clarity. In essence, the nitro group is deoxygenated by the strongly oxygen-attracting tertiary phosphite or phosphine, and a stabilizing ring closure with the adjacent two-nitrogen moiety is the result.

In certain instances where an oxygen-containing group other than nitro (e.g., a carbonyl group) is present within the sphere of ring-forming potentiality, simultaneous deoxygenation of this group and the nitro group can result in formation of a new ring which does not include both of the adjacent pair of nitrogen atoms. This alternative ring-forming reaction is illustrated by the formation of a quinoxaline structure from an o-nitrophenyl compound having a carbomethoxy substituent in addition to the two-nitrogen moiety (cf. Example XII).

The ring closing reaction is carried out at a temperature in the range of 0 to 250° C., preferably in the range of 75 to 200° C. The process is conveniently carried out at atmospheric pressure, but the pressure is not critical and can be below or above atmospheric pressure.

A diluent or solvent is not necessary but can be used if desired. It is convenient to employ a solvent medium as a means of achieving a desired reaction temperature by operation under reflux conditions. If a solvent is employed, however, it should be stable toward the deoxygenation action of the phosphite or phosphine, i.e., it should be free of oxo oxygen as found in carbonyl, carboxyl, nitroso, nitro, sulfoxide or sulfone groups. Aliphatic or aromatic hydrocarbons, halohydrocarbons and ethers are preferred solvent media.

The proportion of tertiary phosphite or phosphine in the reaction mixture is not critical except in terms of effective conversion of the nitrophenyl reactant. Accordingly, it is desirable to use at least the stoichiometric amount of two moles of phosphite or phosphine per mole of nitro compound. If the nitro compound has more than one nitro group, as in o,o'-dinitroazobenzene, amounts of phosphorus reactant stoichiometrically equivalent to any number (including one or all) of such nitro groups would be recommended depending upon whether one, or any specific number, or all of the nitro groups are desired to participate in a ring closing reaction. In the event less than at least one full equivalent of the phosphorus reactant per nitro group is employed, however, a mixture of products would be expected. If the nitro compound also has non-nitro oxo oxygen, as in a substituent containing a carbonyl group, an amount of phosphite or phosphine in excess of the stoichiometric amount needed for deoxygenation of the nitro group alone can also effect deoxygenation of the non-nitro oxo group. The choice of reactant proportions in this instance depends upon whether it is desired to have the non-nitro oxo group participate in a ring-forming reaction. The incidence of mixtures would be minimized by use of a stoichiometric excess of phosphorus reagent.

The products obtained in the ring-forming process just described are ordinarily solid materials which can be isolated and purified by conventional methods, e.g., by crystallization in a suitable solvent and separation from the solution by filtration.

New products of this invention are monobenzotetraazapentalenes and substitution products thereof. More precisely the products of this invention are 2,3-benzo-1,3a,6,6a-tetraazapentalenes having the general formula

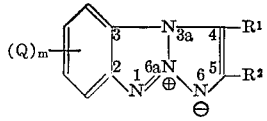

wherein $R^1$ and $R^2$ are hydrogen, lower alkyl, alkoxycarbonyl (—COOAlkyl) of lower alkyl, tricyanovinyl, nitro, sulfo, and halo, the $R^1$ and $R^2$ together can be polymethylene of 3–5 carbons; Q can be a lower alkyl, lower alkylene (including butadienylene, i.e.,

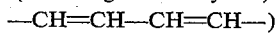

nitro, sulfo, or halo substituent, and $m$ is a cardinal number of up to 2.

These new compounds are basic in character. They are soluble in aqueous mineral acids such as hydrochloric acid and moderately soluble in organic solvents. In general they are colorless but a slight color can be found in the highly substituted derivatives.

The preferred compounds have hydrogen on the heterocyclic ring (i.e., $R^1$ and $R^2$ are hydrogen) since such are readily substituted by an electrophilic group, e.g., nitro, halogen, or sulfo.

The new products of this invention, i.e., 2,3-monobenzo-1,3a,6,6a-tetraazapentalenes, are obtained preferably by the ring closure method discussed above. Specifically, this process is applied to a 1-(o-nitroaryl)-1,2,3-triazole as shown in Examples I–VII below. The desired triazole is obtained by reaction of an o-chloronitroaryl with a 1,2,3-triazole in which any nuclear substituents are lower aliphatic hydrocarbon or alkoxycarbonyl groups, or by reaction of an o-nitroaryl azide with acetylene or an acetylene derivative. In the triazole reaction with an o-chloronitroaromatic, two isomers are obtained. These are the 1-(o-nitroaryl)1,2,3-triazole and the 2-(o-nitroaryl)-1,2,3-triazole, which can be separated by fractional crystallization and/or chromatography.

Substitution reactions on the preferred products, i.e., where $R^1$ and $R^2$ are hydrogen, can take place since these (especially $R^2$) are active positions for substitution reactions. Thus, derivatives of the preferred products bearing a variety of substituents can be prepared as shown in Examples VIII–X.

An alternative method of preparing the products of this invention involves decomposition of an appropriate 1-(o-azidoaryl)-1,2,3-triazole. Example XI illustrates this process.

The invention is illustrated in greater detail in the following examples.

EXAMPLE I 2,3;4,5-dibenzo-1,3a,6,6a-tetraazapentalene from 1-(o-nitrophenyl)benzotriazole

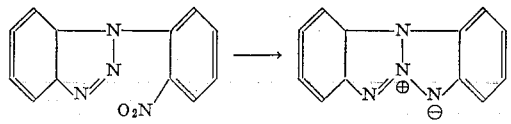

A. A solution of 4.8 g. (0.02 g. mole) of 1-(o-nitrophenyl)benzotriazole and 11 g. (0.044 g. mole) of tributyl phosphite in 100 ml. of xylene was refluxed overnight. The crystalline solid product, obtained on cooling the reaction mixture to room temperature and separated by filtration, weighed 1.87 g. An additional 0.35 g. of the crystalline material was obtained on dilution of the xylene filtrate with 3 volumes of pentane. The product was identified by its infrared spectrum as 2,3-4,5-dibenzo-1,3a,6,6a-tetraazapentalene (cf. application Serial No. 252,059, now U.S. Patent 3,166,567). Alternatively, using nomenclature based on principles in the Ring Index, second edition, this compound is named 5,7-didehydro - 5H,7H - dibenzo - v - triazolo[1,2-a] - v - triazole. The product was also obtained by use of other phosphites, the data being shown in the following tabulation.

TABLE 1

| Example | I-B | I-C | I-D |
|---|---|---|---|
| Phosphite | Triphenyl | Triethyl | [1] Triethyl |
| Moles phosphite per mole nitro compound | 3.8 | 3.5 | 3.25 |
| Solvent | None | Xylene | Xylene |
| Temp., °C | 100 | 140 | 140 |
| Time, hrs | 96 | 20 | 18 |
| Yield, percent | 17 | 61 | 65 |

[1] Added portionwise.

EXAMPLE II 2,3;5,6-dibenzo-1,3a,4,6a-tetraazapentalene from 2-(o-nitrophenyl)benzotriazole

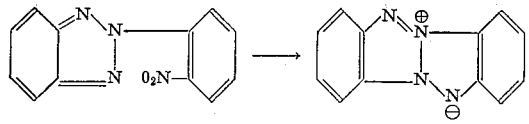

A. A solution of 1.20 g. (0.005 g. mole) of 2-(o-nitrophenyl)benzotriazole in 15 ml. of xylene was mixed with 3.75 ml. (0.015 g. mole) of tributylphosphine, and the mixture was heated to reflux for 4 hours. After standing overnight, the mixture was poured into 2 volumes of hexane, and the solid precipitate thus produced was filtered. The solid product (0.78 g.) was identified as 2,3;5,6-dibenzo-1,3a,4,6a-tetraazapentalene by its infrared spectrum (cf. U.S. Reissue 25,238). Based on Ring Index principles, the compound is also named 5,11-didehydro-5H,11H-dibenzo-v-triazolo-[2,1-a]-v-triazole.

TABLE 2

| Example | II-B | II-C | II-D | II-E |
|---|---|---|---|---|
| Phosphite | Tributyl | Triethyl | Triethyl | Triethyl |
| Moles phosphite per mole nitro compound | 4.0 | 2.2 | 3.1 | 4.1 |
| Solvent | Xylene | Xylene | Xylene | Xylene |
| Temp., °C | 140 | 140 | 140 | 140 |
| Time, hrs | 17 | 17 | 17 | 17 |
| Yield, percent | 82 | 65 | 86 | 88 |

The (o-nitrophenyl)benzotriazoles for the preceding examples were prepared in the following manner: A mixture of 25 g. (0.21 g. mole) of benzotriazole, 33 g. (0.21 g. mole) of o-chloronitrobenzene and 25 g. (0.305 g. mole) of powdered anhydrous sodium acetate was heated under a nitrogen atmosphere at 215° C. for 17 hours. The resultant reaction mixture was subjected to steam distillation to remove unchanged o-chloronitrobenzene, and the residue was dissolved in 150 ml. of warm benzene. The benzene solution was passed through a chromatographic column, 100 mm. long x 100 mm. diameter, containing silicic acid, and the adsorbed material was eluted with benzene. The first 620 ml. of eluate was rejected. Evaporation of the next 1900 ml. of eluate gave 4.39 g. of yellow crystalline product which, after being recrystallized twice from ethanol, melted at 132–133° C. The recrystallized compound was identified as 2-(o-nitrophenyl)-benzotriazole.

Analysis for $C_{12}H_8N_4O_2$: Calc'd C, 60.0; H, 3.36; N, 23.3. Found: C, 60.0; H, 3.74; N, 22.6.

The ultraviolet spectrum showed maxima at 302 m$\mu$ ($\epsilon$=14,400), 290 m$\mu$($\epsilon$=13,800) and 222 m$\mu$($\epsilon$=24,500). The identification of 2-(o-nitrophenyl)benzotriazole was verified by reduction of the compound with sodium sulfide in aqueous ethanol, to form 2-(o-aminophenyl)benzotriazole, M.P. 93.5–94° C. (cf. copending application Serial No. 173,806, filed February 16, 1962, and now abandoned).

Continued elution of the silicic acid column with methylene chloride yielded an eluate which on evaporation gave 13.64 g. of orange crystalline product. After recrystallization from ethanol, this product, M.P. 118.9–120° C., was identified as 1-(o-nitrophenyl)benzotriazole [cf. Starkova et al., C.A. 51, 10541 (1957)].

EXAMPLE III

*2,3;5,6-dibenzo-1,3a,4,6a-tetraazapentalene from o,o'-dinitroazobenzene*

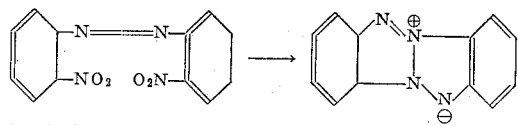

A solution of 0.5 g. (0.00184 g. mole) of o,o'-dinitroazobenzene (Beilstein, vol. XVI, 1st Supp., 1934, p. 225) and 2.0 g. (0.012 g. mole) of triethyl phosphite in 5 ml. of xylene was refluxed overnight. The solution was cooled, and the yellow crystalline product (0.14 g.) was filtered and identified as 2,3;5,6-dibenzo-1,3a,4,6a-tetraazapentalene.

EXAMPLE IV

*5,7-didehydro-3-nitro-5H,7H-dibenzo-v-triazolo[1,2-a]-v-triazole from 1-(2,4dinitrophenyl)-1,2,3-benzotriazole*

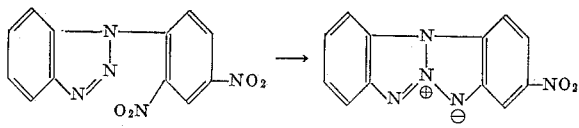

A mixture of 2.4 g. (0.0084 g. mole) of 1-(2,4-dinitrophenyl)-1,2,3-benzotriazole [Borsche et al., Ann. 379, 169 (1911)] and 30 ml. of p-xylene was stirred and heated to reflux. A solution of 2.9 g. (0.017 g. mole) of triethyl phosphite in 15 ml. of p-xylene was added over a period of six minutes. After 35 minutes at reflux (ca. 140° C.) the mixture was cooled to 50° C. and poured into 2 to 3 volumes of cyclohexane. The resultant solid precipitate was separated by filtration, washed with cyclohexane, and air-dried. It was a brown powder weighing 2.0 g. and melting over the range 280–290° C. The brown solid was purified by elution with methylene chloride through a bed of neutral (pH 7) chromatographic-grade alumina. The eluate on evaporation yielded 0.6 g. of yellow crystalline solid, M.P. 290–296° C., which was identified as 5,7-didehydro-3-nitro-5H, 7H-dibenzo-v-triazole[1,2-a]-v-triazole, i.e., a mononitro derivative of 2,3;4,5-dibenzo-1,3a,6,6a-tetraazapentalene, by its method of preparation and by its infrared spectrum showing strong absorption indicative of the nitro group at 1350 and 1535 cm.$^{-1}$.

Analysis for $C_{12}H_7N_5O_2$: Calc'd C, 56.9; H, 2.79; N, 27.7. Found: C, 57.2; H, 3.03; N, 27.8.

EXAMPLE V

*2,3-benzo-1,3a,4,6a-tetraazapentalene*

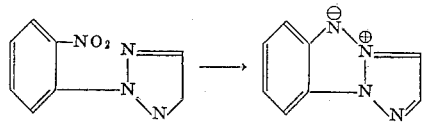

A solution of 2-(o-nitrophenyl)-1,2,3-triazole in 20 ml. of xylene was heated in an oil bath maintained at 150° C., and a solution of 14 ml. of trimethyl phosphite in 15 ml. of xylene was added dropwise over a period of 15 hours. The solution was cooled, and xylene, trimethyl phosphate, and unreacted trimethyl phosphite were removed under reduced pressure using a rotating vacuum evaporator. The residue crystallized and was dried on a clay plate. This product was sublimed under vacuum to yield 4.2 g. of colorless crystals of 2,3-benzo-1,3a,4,6a-tetraazapentalene [alternatively named 1,5-didehydro-1H,5H-v-triazolo [2,1-a]benzotriazole.

Analysis for $C_8H_6N_4$: Calc'd C, 60.75; H, 3.82; N, 35.42. Found: C, 60.67; H, 4.22; N, 35.19

The ultraviolet spectrum exhibited peaks at 343 m$\mu$ ($\epsilon$=21,800), 278 m$\mu$($\epsilon$=3,040) and 236 m$\mu$ ($\epsilon$=27,700). The compound was easily nitrated with 90% nitric acid.

The 2-(o-nitrophenyl)-1,2,3-triazole was prepared by vigorously stirring for 25 hours a mixture of 34.5 g. of 1,2,3-triazole, 150 g. of o-chloronitrobenzene, 50 g. of sodium acetate, and 5 g. of copper powder contained in a 300 ml. flask immersed in an oil bath maintained at 205° C. Acetic acid distilled out of the mixture as the reaction proceeded. The mixture was poured on ice. Methylene chloride was added, and the mixture was filtered. The organic layer was steam distilled to remove o-chloronitrobenzene, and the residue was chromatographed on a column of Woelm neutral activated alumina using methylene chloride as an eluant. The first material eluted was 10.02 g. of 2-(o-nitrophenyl)-1,2,3-triazole. This was recrystallized from pentane-benzene (5:3) at −20° C. to yield white crystals melting at 27.0–27.5° C.

Analysis for $C_8H_6N_4O_2$: Calc'd C, 50.53; H, 3.18; N, 29.47. Found: C, 50.87; H, 3.30; N, 29.66.

The ultraviolet spectrum exhibited a peak at 238 m$\mu$ ($\epsilon$=15,200) and shoulders at 265 m$\mu$ ($\epsilon$=7,350) and 300 m$\mu$ ($\epsilon$=2,400).

Example V illustrates the novel process of this invention for preparing 2,3-monobenzo-1,3a,4,6a-tetraazapentalenes disclosed and claimed in the patent application of R. A. Carboni filed concurrently herewith.

EXAMPLE VI

*2,3-benzo-1,3a,6,6a-tetraazapentalene from 1-(o-nitrophenyl)-1,2,3-triazole*

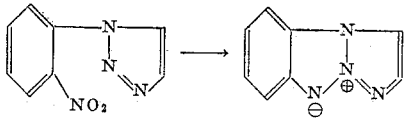

A solution of 1.14 g. (0.006 g. mole) of 1-(o-nitrophenyl)-1,2,3-triazole and 4.0 g. (0.0322 g. mole) of trimethyl phosphite in 10 ml. of xylene was refluxed overnight. The solution was cooled and filtered. Evaporation of the filtrate to dryness under vacuum gave a dark crystalline residue, which weighed 0.31 g. after being dried and washed on a clay plate with hexane. The product was identified as 2,3-benzo-1,3a,6,6a-tetraazapentalene

[alternatively named 1,9-didehydro-1H,9H-v-triazolo[1,2-a]-benzotriazole.

Analysis for $C_8H_6N_4$: Calc'd C, 60.8; H, 3.83; N, 35.4. Found: C, 61.0; H, 3.83; N, 35.7, 35.9.

The ultraviolet spectrum showed maxima at 305 mμ ($\epsilon$=16,100), 326 mμ ($\epsilon$=15,200), 293 mμ ($\epsilon$=4,110), 285 mμ ($\epsilon$=3,760), and 232 mμ ($\epsilon$=28,600). The product is identical with that obtained by reduction of 1-(o-nitrophenyl)-1,2,3-triazole to the corresponding primary amine, conversion of the amine to the azide through diazotization and reaction of the diazonium salt with sodium azide, and pyrolysis of the azide at a temperature over 100° C.

The 1-(o-nitrophenyl)-1,2,3-triazole for Example VI was prepared in the following manner: A solution of 50 g. (0.3 g. mole) of o-nitrophenyl azide in 300 ml. of acetone in a 1-liter autoclave was heated with acetylene gas under a pressure of about 250 pounds per square inch at 50° C., 60° C. and 70° C., successively, over a period of 6 hours. The solution was then filtered at room temperature, and the filtrate was evaporated to dryness under reduced pressure. The solid residue, after recrystallization from a mixture of 150 ml. of benzene and 50 ml. of hexane, weighed 31.7 g. The product was recrystallized a second time, M.P. 94.3–95.1° C., and was identified as 1-(o-nitrophenyl)-1,2,3-triazole.

Analysis for $C_8H_6N_4O_2$: Calc'd C, 50.5; H, 3.18; N, 29.5. Found: C, 50.6; H, 3.18; N, 30.5, 30.7.

The infrared spectrum showed strong absorption at 1360 cm.$^{-1}$ (for —$NO_2$) and 1540 cm.$^{-1}$. The ultraviolet spectrum showed maxima at 290 mμ ($\epsilon$=1,650) and 223 mμ ($\epsilon$=13,800).

EXAMPLE VII

*2,3-benzo-4,5-bis(carbomethoxy)-1,3a,6,6a-tetraazapentalene from 4,5-bis(carbomethoxy)-1(o-nitrophenyl)-1,2,3-triazole*

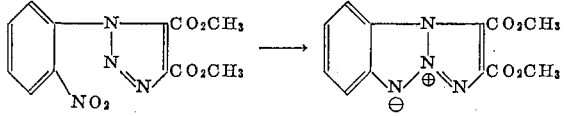

A. A solution of 6.12 g. (0.02 g. mole) of 4,5-bis(carbomethoxy)-1-(o-nitrophenyl)-1,2,3-triazole and 10 g. (0.04 g. mole) of tributyl phosphite in 100 ml. of toluene was refluxed overnight. The solution was cooled, 200 ml. of hexane was added, and unreacted triazole was precipitated. After removal of the crystalline triazole (1.9 g.) by filtration, the filtrate was evaporated to dryness under reduced pressure. The residual solid (0.57 g.) was recrystallized successively from methanol and from 3/1 benzene/hexane to yield a product, M.P. 127–128.4° C., which was identified as 2,3-benzo-4,5-bis(carbomethoxy)-1,3a,6,6a-tetraazapentalene [alternatively named 2,3-bis(carbomethoxy)-1,9-didehydro-1H,9H-v-triazolo[1,2-a]benzotriazole.

Analysis for $C_{12}H_{10}N_4O_4$: Calc'd C, 52.6; H, 3.68; N, 20.4. Found: C, 52.9; H, 3.76; N, 20.5.

The infrared spectrum showed absorption characteristic of the carbonyl group at 1700 and 1740 cm.$^{-1}$. The ultraviolet spectrum showed maxima at 353 mμ ($\epsilon$=14,400), 284 mμ ($\epsilon$=9,300), 250 mμ ($\epsilon$=18,900), and 223 mμ ($\epsilon$=16,200). The product was also obtained by use of triethyl phosphite, with data shown below.

TABLE 3

| Example | V-B | V-C |
|---|---|---|
| Moles phosphite per mole nitro compound | 3.0 | 2.1 |
| Method of phosphite addition | All at once | Gradual |
| Solvent | Xylene | Toluene |
| Temp., °C | 140 | 110 |
| Time, hrs | 17 | 24 |
| Yield, percent | 8 | 25 |

EXAMPLE VIII

*2,3-(nitrobenzo)-5-nitro-1,3a,6,6a-tetraazapentalene*

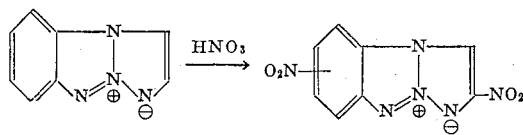

2,3 - benzo - 1,3a,6,6a - tetraazapentalene (2.0 g.) was added in small portions while stirring to 100 ml. of 70% nitric acid while maintaining the temperature at 0–5° C. with an ice bath. The solution was stirred for 15 minutes at 0° C. and was then allowed to warm to room temperature. The resulting solution was filtered to yield 1.95 g. of crude dinitro derivative. After recrystallization from 400 ml. of acetone, the orange-colored crystalline dinitro-2,3-benzo-1,3a,6,6a-tetraazapentalene melted at 277.5–280° C. Alternatively, this compound is named 1,9-didehydro - 2 - nitro - 1H,9H - v - triazolo[1,2 - a]- (nitrobenzo)triazole.

Analysis for $C_8H_4N_6O_6$: Calc'd C, 39.03; H, 1.64; N, 34.15. Found: C, 38.74; H, 1.83; N, 34.09.

Spectra:

UV: $\lambda_{max}$ 420 mμ $\epsilon$=20,900
348         6,130
338         6,130
312         11,900
278 sh.     8,300
270         9,380
250         11,900

IR: 1,510 and 1,342 cm.$^{-1}$ ($NO_2$ absorptions) Strong peaks at 1460, 1,380, and 1,282 cm.$^{-1}$

EXAMPLE IX

*2,3-(dinitrobenzo)-5-nitro-1,3a,6,6a-tetraazapentalene*

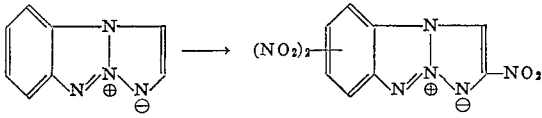

A total of 5.7 g. of 2,3-benzo-1,3a,6,6a-tetraazapentalene was added in small portions (while stirring) to 75 ml. of yellow fuming (95%) nitric acid maintained at 0–5° C. The solution was then allowed to warm to room temperature. It was poured on ice and filtered. The olive-colored product weighed 7.50 g. After successive recrystallizations from 500 ml. of boiling acetone and treatment with decolorizing charcoal and from 400 ml. of 1:1 acetone-ethanol and decolorizing charcoal, the trinitro derivative, namely, 1,9 - didehydro - 2 - nitro - 1H, 9H - v - triazolo[1,2 - a](dinitrobenzo) - triazole, melted at 305–306.5° C., dec.

Analysis for $C_8H_3N_7O_6$: Calc'd C, 32.77; H, 1.03; N, 33.45. Found: C, 32.62; H, 1.12; N, 33.51.

Spectra:

UV: $\lambda_{max}$ 434 mμ $\epsilon$=27,900
335         5,300
294         16,400

IR: (KBr) $NO_2$ at 1,520 and 1,342/1,332 cm.$^{-1}$. Strong peak at 1,250 cm.$^{-1}$

EXAMPLE X

*Tricyanovinyl-2,3-benzo-1,3a,6,6a-tetraazapentalene*

A solution of 0.84 g. of 2,3-benzo-1,3a,6,6a-tetraazapentalene in 10 ml. of dimethylformamide was treated with a solution of 0.70 g. of tetracyanoethylene in 10 ml. of dimethylformamide. The initial green color of the complex gradually changed to purple. The solution was warmed on the steam bath for 30 minutes and was then poured on 200 ml. of crushed ice and stirred for 15 minutes. The precipitated purple crystals (0.85 g.) were filtered and washed with water. A 0.40 g. portion of tricyanovinyl - 2,3 - benzo - 1,3a,6,6a - tetraazapentalene (i.e., 1,9 - didehydro - 1H,9H - tricyanovinyl - v - triazolo- [1,2-a]benzotriazole) after recrystallization from 125 ml. of benzene and 75 ml. of hexane melted at 236–237.4° C.

Analysis for $C_{13}H_5N_7$: Calc'd C, 60.23; H, 1.94; N, 37.83. Found: C, 60.01; H, 2.23; N, 37.62.

UV and visible spectrum (acetonitrile):

| $\lambda_{max}$ | $\epsilon=$ |
|---|---|
| 534 m$\mu$ | 24,700 |
| 333 | 6,250 |
| 310 | 6,090 |
| 278 | 4,560 |
| 225 | 19,050 |

A solution of 0.02 g. of tricyanovinyl-2,3-benzo-1,3a,6, 6a-tetraazapentalene in 3 ml. of acetone was added to a boiling solution of two drops of a commercial wetting agent in 50 ml. of boiling water. Small swatches (about 3 x 3 cm.) of fabric of polyethylene terephthalate, acetate, and nylon were added, and the solution was boiled for ten minutes. The swatches were removed, washed with soap and water, and dried. All were dyed reddish-purple.

EXAMPLE XI

*4,5-tetramethylene-2,3-benzo-1,3a,6,6a-tetraazapentalene*

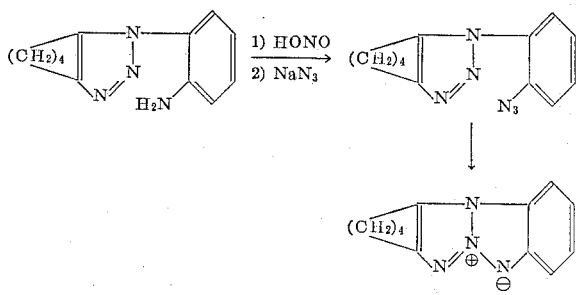

A solution of 8.0 g. of 1-(o-azidophenyl)-4,5,6,7-tetra-hydrobenzotriazole in 50 ml. of o-dichlorobenzene was added slowly to 40 ml. of o-dichlorobenzene in a flask immersed in an oil bath maintained at 180° C. The solution was heated for one hour by which time nitrogen evolution had ceased. The resulting black solution was evaporated at 70° C. under vacuum. The solid residue was dissolved in 100 ml. of methylene chloride and eluted continuously with methylene chloride through a column (50 x 150 mm.) of Woelm neutral alumina. The eluate was evaporated under vacuum to yield 3.75 g. (53%) of nearly white crystals of 4,5 - tetramethylene - 2,3 - benzo-1,3a,6,6a - tetraazapentalene [alternatively named 7,8,9, 10 - tetrahydro - 5,11 - didehydro - 5H,11H - dibenzo-v-triazolo[1,2-a]-triazole]. Successive recrystallizations from ethanol and methanol yielded shiny colorless leaflets which melted at 176.5–177.5° C. (On standing in methanol the leaflets redissolved and were converted to a granular crystalline modification which had a slightly different infrared spectrum; a prominent absorption appeared at 758 cm.$^{-1}$.)

Analysis for $C_{12}H_{12}N_4$: Calc'd C, 67.90; H, 5.98; N, 26.40. Found: C, 68.07; H, 5.71; N, 26.17, 26.41, 26.42.

The ultraviolet spectrum was:

| $\lambda_{max}$ | $\epsilon=$ |
|---|---|
| 343 m$\mu$ | 16,400 |
| 335 | 16,600 |
| 299 | 4,080 |
| 290 sh. | 3,440 |
| 236 | 29,800 |

The (o - azidophenyl) - 4,5,6,7 - tetrahydrobenzotriazole was prepared as follows:

A solution of 13.95 g. of 1-(o-aminophenyl)-4,5,6,7-tetrahydrobenzotriazole was dissolved in a solution of 150 ml. of concentrated hydrochloric acid and 100 ml. of water. Ice (ca. 150 g.) was added to the solution and by means of a −30° C. cooling bath ("Dry Ice"/CCl₄/CHCl₃)

the mixture was cooled to −20° C. A solution of 4.8 g. of 97% sodium nitrite in 30 ml. of water was slowly added at −20 to −25° C. The mixture was stirred for an hour at −25° C. and a solution of 5.0 g. of sodium azide in water was added slowly while maintaining the reaction temperature at −20 to −25° C. (Ether was added to suppress foaming.) The resulting solution was allowed to warm slowly to room temperature while stirring overnight. It was then made alkaline with potassium hydroxide and the precipitate was separated by filtration. The crude 1-(o-azidophenyl)-4,5,6,7-tetrahydrobenzotriazole weighed 11.7 g. (75%). A portion recrystallized from benzene/hexane melted at 105–106.5° C. It was soluble in 10% hydrochloric acid.

Analysis for $C_{12}H_{12}N_6$: Calculated C, 59.99; H, 5.04; N, 34.98. Found: C, 60.53; H, 5.27; N, 35.72, 36.05.

The ultraviolet spectrum showed a $\lambda_{max}$ 248 m$\mu$, $\epsilon=12300$.

The 1-(o-aminophenyl) - 4,5,6,7-tetrahydrobenzotriazole used above was prepared as follows:

A solution of 45 g. of 2,3,4,5-dibenzo-1,3a,6,6a-tetraazapentalene in 650 ml. of ethanol was hydrogenated at 125° C. and 1000 p.s.i. pressure, using 3 g. of 5% palladium-on-carbon catalyst. The product was filtered, and the solvent was removed under vacuum to leave 7.8 g. of an amber viscous oil. The oil was crystallized from a mixture of 85 ml. of benzene and 150 ml. of hexane to yield 12.7 g. of colorless crystals of 1-(o-aminophenyl)-4,5,6,7-tetrahydrobenzotriazole. A second crop of 1.4 g. was obtained by treatment of the filtrate with 100 ml. of pentane bringing the total yield to 30%. A portion recrystallized from benzene/hexane for analysis melted at 115.5–116.2° C.

Analysis for $C_{12}H_{14}N_4$: Calculated C, 67.27; H, 6.58; N, 26.16. Found: C, 67.49; H, 6.91; N, 26.25.

The ultraviolet spectrum was as follows:

| $\lambda_{max}$ | $\epsilon=$ |
|---|---|
| 299 m$\mu$ | 3,470 |
| 231 | 15,000 |

EXAMPLE XII

*3-carbomethoxy - 4-methoxy-v-triazolo - (3,4a)-quinoxaline from 4,5-bis(carbomethoxy) - 1-(o-nitrophenyl)-1,2,3-triazole*

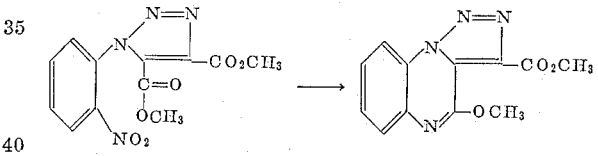

A solution of 8.46 g. (0.042 g. mole) of tributylphosphine in 50 ml. of benzene was added dropwise over a period of 50 hours to a refluxing solution of 6.12 g. (0.02 g. mole) of 4,5-bis(carbomethoxy)-1-(o-nitrophenyl)-1,2,3-triazole in 100 ml. of benzene. Solvent and unreacted phosphine were evaporated from the reaction mixture at 50° C. under 1 mm. pressure. The dark crystalline residue, after being pressed and washed with a small amount of pentane on a porous plate, weighed 1.70 g. Successive recrystallization of the product from ethanol and from methanol yielded white needles, M.P. 193.8–195.0° C. The product was identified as 3-carbomethoxy-4-methoxy-v-triazolo - (3,4a)-quinoxaline by its infrared, ultraviolet and nuclear magnetic resonance spectra. The nuclear magnetic resonance spectrum exhibited sharp proton resonances at 5.83$\tau$ and 5.86$\tau$ (characteristic of methoxyl protons in two different environments) and broad proton resonance at 1.9–2.4$\tau$ (aromatic protons). The infrared spectrum showed strong absorption at 1735, 1580, 1445, 1382 and 1335 cm.$^{-1}$; and the ultraviolet spectrum showed maxima at 331 m$\mu$ ($\epsilon=11,420$), 317m$\mu$ ($\epsilon=13,390$), 305 m$\mu$ ($\epsilon=8,260$), 291 m$\mu$ ($\epsilon=7,520$), 280 m$\mu$ ($\epsilon=7,550$), 265 m$\mu$ ($\epsilon=8,530$), 249 m$\mu$ ($\epsilon=13,930$), and 272 m$\mu$ ($\epsilon=24,000$).

Analysis for $C_{12}H_{10}N_4O_3$: Calculated C, 55.8; H, 3.91; N, 21.7. Found: C, 55.8; H, 4.02; N, 21.5.

The 4,5-bis(carbomethoxy) - 1-(o-nitrophenyl)-1,2,3-triazole for Examples VII and XII was prepared in the following manner: A solution of 41 g. (0.25 g. mole) of o-nitrophenyl azide and 40 g. (0.28 g. mole) of dimethyl acetylenedicarboxylate in 25 ml. of chloroform was held at 30° C. for 15 days. A crystalline product was formed which, after being filtered and washed with 1/3 chloroform/hexane, weighed 35.7 g. Additional crystalline product (23.8 g.) was isolated from the filtrate and washings by removal of the solvents under reduced pressure and recrystallization of the residue from aqueous methanol. The product, identified as 4,5-bis(carbomethoxy)-1-(o-nitrophenyl)-1,2,3-triazole, was further purified by successive recrystallizations from aqueous methanol and from 3/1 benzene/hexane; M.P. 87.5–88.0° C.

Analysis for $C_{12}H_{10}N_4O_6$: Calculated C, 47.1; H, 3.29; N, 18.3. Found: C, 47.2; 3.44; N, 18.4.

The infrared spectrum showed absorption characteristic of aromatic ester carbonyl at 1730 cm.$^{-1}$ and of the nitro group at 1538 and 1350 cm.$^{-1}$.

A variety of reactants can be used in the ring closing process illustrated in the foregoing examples. Representative tertiary phosphites and phosphines which can be employed as deoxygenating reagents, in addition to those shown in the examples, are: trioctyl phosphite, tri(dodecyl) phosphite, tri(octadecyl) phosphite, tricyclohexyl phosphite, trimethylphosphine, triethylphosphine, triheptylphosphine, tridecylphosphine, tri(hexadecyl)phosphine, tricyclohexylphosphine, and triphenylphosphine. Representative o-nitrophenylazo compounds include 2-nitroazobenzene, 2-nitrobenzeneazomethane, 2-nitrobenzeneazoethane, 2-nitrobenzeneazohexane, 2-nitrobenzeneazocyclohexane, 2'-nitro - 1-naphthaleneazobenzene and 2'-nitro - 2-naphthaleneazobenzene. o-Nitrophenyl-substituted heterocyclic compounds that can be used are exemplified as follows: 1,2-diazoles such as 1-(o-nitrophenyl)pyrazole, 1-(o-nitrophenyl)- 4-chloropyrazole, 1-(o-nitrophenyl)indazole and 2-(o-nitrophenyl)indazole; 1,2,3-triazoles such as 2-(o-nitrophenyl)-4,5-dimethyl-1,2,3-triazole; 1,2,4-triazoles such as 1-(o-nitrophenyl)-1,2,4-triazole; and tetrazoles such as 1-(o-nitrophenyl)tetrazole and 2-(o-nitrophenyl)tetrazole.

Additional monobenzenoid - 1,3a,6,6a - tetraazapentalenes that are obtained by the general process of Examples VI and VII include the following:

2,3-($\alpha,\beta$-naphtho)-1,3a,6,6a-tetraazapentalene from 1-($\beta$-nitro-$\alpha$-naphthyl)-1,2,3-triazole obtained from $\alpha$-chloro-$\beta$-nitronaphthalene and 1,2,3-triazole;

2,3-($\beta,\gamma$-naphtho)-4,5 - dimethyl - 1,3a,6,6a - tetraazapentalene from 1-($\gamma$-nitro-$\beta$-naphthyl)-4,5-dimethyl-1,2,3-triazole obtained from $\gamma$-chloro-$\beta$-nitronaphthalene and 4,5-dimethyl-1,2,3-triazole, the latter derived from the reaction of 2-butyne and hydrazoic acid;

6-n-butyl-1,9-didehydro-1H,9H-v-triazolo[1,2 - a]benzotriazole from 1-(5-n-butyl-2-nitrophenyl)-1,2,3-triazole obtained from 2-chloro-5-n-butylnitrobenzene and 1,2,3-triazole;

2,3-benzo-5-n-butyl - 1,3a,6,6a - tetraazapentalene from 4-n-butyl-1-(o-nitrophenyl)-1,2,3-triazole obtained from o-chloronitrobenzene and 4 - n - butyl-1,2,3 - triazole, the latter from reaction of hydrazoic acid with n-butylacetylene(1-hexyne); and 2,3-benzo-5-vinyl - 1,3a,6,6a - tetraazapentalene from 4-vinyl-1-(o-nitrophenyl) - 1,2,3 - triazole, the latter from vinylacetylene and hydrazoic acid.

2,3-aryl-1,3a,6,6a-tetraazapentalenes undergo substitution reactions with electrophilic reagents. Compounds having hydrogen in the 5-position undergo substitution reactions first in this position to form, e.g., 5-nitro, 5-sulfo, 5-chloro, 5-bromo, etc. Reagents next rapidly attack the aromatic, e.g., benzo ring and in the latter generally up to 2 positions can be substituted. Prolonged reaction can give 4-substituents, e.g., polychloro derivatives having chlorine on the 4 and 5 positions can be obtained.

Reaction with chlorosulfonic acid at about 90° C. with 2,3-benzo-1,3a,6,6a-tetraazapentalene gives 2,3 - (chlorosulfonylbenzo)-5-chlorosulfonyl-1,3a,6,6a - tetraazapentalene.

Addition of chlorine to a solution of 2,3-benzo-1,3a,6,6a-tetraazapentalene in refluxing carbon tetrachloride gives 2,3-(dichlorobenzo)-5-chloro - 1,3a,6,6a - tetraazapentalene. Bromine can likewise be substituted for chlorine to give mono-, d-, or tribromo derivatives.

Nitro groups can be reduced, e.g., by treatment with hydrogen in the presence of palladium-on-carbon to give the corresponding amino groups from which other groups such as azido, alkoxy, etc., can be obtained.

The various products obtained by the ring closing process illustrated above are thermally stable materials which can be nitrated on the benzenoid portions thereof. Polynitro derivatives thus obtained retain their relatively high thermal stability but also have explosive properties such as are generally characteristic of polynitro aromatic compounds. Accordingly, such polynitro derivatives are useful in the formulation of high explosives which can withstand relatively high temperatures and which, therefore, can be handled with extra safety at usual ambient temperatures.

The 2,3-benzo-1,3a,6,6a-tetraazapentalenes, specifically, absorb ultraviolet light. They are generally colorless. They are useful for the preparation of filters for light and can be used in formulation of sunburn screening cream, e.g., by forming a homogeneous mixture of triethanolamine, stearic acid, white wax, stearyl alcohol and the compound of Example VI in a ratio of 1/4/4/16/10 followed by dispersion in aqueous glycerol.

As many widely different embodiments may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. Process for the ring closure of (o-nitrophenyl)-substituted compounds which comprises (I) contacting and reacting, at a temperature in the range of 0° C. to 250° C., a compound of the formula

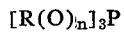

wherein R is an aliphatically saturated hydrocarbon radical and $n$ is an integer in the range 0 to 1, with a compound of the formula

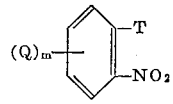

wherein T is a substituent selected from the group consisting of (a) —N=N—Z wherein Z is a member selected from the class consisting of alkyl, aryl, aralkyl and o-nitroaryl and (b) a heterocyclic group in which the heterocyclic ring thereof contains five members consisting solely of carbon and from 2 to 4 nitrogen atoms, one nitrogen of which is bonded to the above depicted ortho position nuclear carbon and to at least one other nitrogen of said heterocyclic ring, Q is a substituent selected from the group consisting of lower alkyl, lower alkylene, nitro, sulfo and halo and $m$ is an integer in the range 0 to 2 inclusive, and (iii) recovering the resultant polynitrogen heterocyclic compound having o-phenylene-attached nitrogens.

2. Process for the ring closure of (o-nitrophenyl)-substituted compounds which comprises (I) contacting and reacting, at a temperature in the range 75° C. to 200° C. and in the presence of an organic solvent free of oxo oxygen, an approximate stoichiometric amount of a compound of the formula

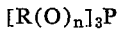

wherein R is an aliphatically saturated hydrocarbon radical of 1 to 18 carbon atoms inclusive and $n$ is an integer in the range 0 to 1, with a compound of the formula

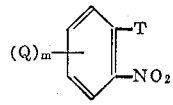

wherein T is a substituent selected from the group consisting of (a) —N=N—Z wherein Z is an o-nitroaryl group of up to and including 12 carbon atoms and (b) a heterocyclic group in which the heterocyclic ring thereof contains five members consisting solely of carbon and from 2 to 4 nitrogen atoms, one nitrogen of which is bonded to the above depicted ortho position nuclear carbon and to at least one other nitrogen of said heterocyclic ring, Q is a substituent selected from the group consisting of lower alkyl, lower alkylene, nitro, sulfo, and halo and m is an integer in the range 0 to 2 inclusive, and (II) recovering the resultant polynitrogen heterocyclic compound having o-phenylene-attached nitrogens.

3. The process defined by claim 2 wherein said solvent is an aromatic hydrocarbon and T is —N=N—Z wherein Z is the o-nitrophenyl group.

4. The process defined by claim 2 wherein said solvent is an aromatic hydrocarbon and T is —N=N—Z wherein Z is the o-nitrophenyl group and m is zero.

5. The process defined by claim 2 wherein said solvent is an aliphatic hydrocarbon and T is a benzotriazole group.

6. A compound of the formula

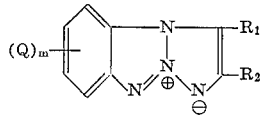

wherein $R_1$ and $R_2$ taken singly represent members of the group consisting of hydrogen, lower alkyl, alkoxycarbonyl of lower alkyl, tricyanovinyl, nitro, sulfo and halo and taken together represent polymethylene of 3 to 5 carbon atoms, Q is a member of the group consisting of lower alkyl, lower alkylene, sulfo and nitro, and m is an integer of up to and including two.

7. A compound as defined in claim 6 wherein $R_1$ and $R_2$ each represents hydrogen and Q represents nitro.

8. A compound as defined in claim 6 wherein $R_1$ and $R_2$ each represents carbalkoxy of lower alkyl and m is zero.

9. A compound as defined in claim 6 wherein $R_1$ represents hydrogen and $R_2$ and Q each represents nitro.

10. A compound as defined in claim 6 wherein $R_1$ and $R_2$ together represent polymethylene of 3 to 5 carbon atoms and m is zero.

11. 1,9 - didehydro - 1H,9H - v - triazolo[1,2 - a]benzotriazole.

12. 2,3 - bis(carbomethoxy) - 1,9 - didehydro - 1H,9H - v - triazolo[1,2 - a]benzotriazole.

13. 1,9 - didehydro - 2 - nitro - 1H,9H - v - triazolo[1,2 - a] - (nitrobenzo)triazole.

14. 1,9 - didehydro - 2 - nitro - 1H,9H - v - triazolo[1,2 - a] - (dinitrobenzo)triazole.

15. 1,9 - didehydro - 1H,9H - tricyanovinyl - v - triazolo - [1,2 - a]benzotriazole.

No references cited.

ALEX MAZEL, *Primary Examiner.*

ALTON D. ROLLINS, *Assistant Examiner.*